UNITED STATES PATENT OFFICE 2,111,722

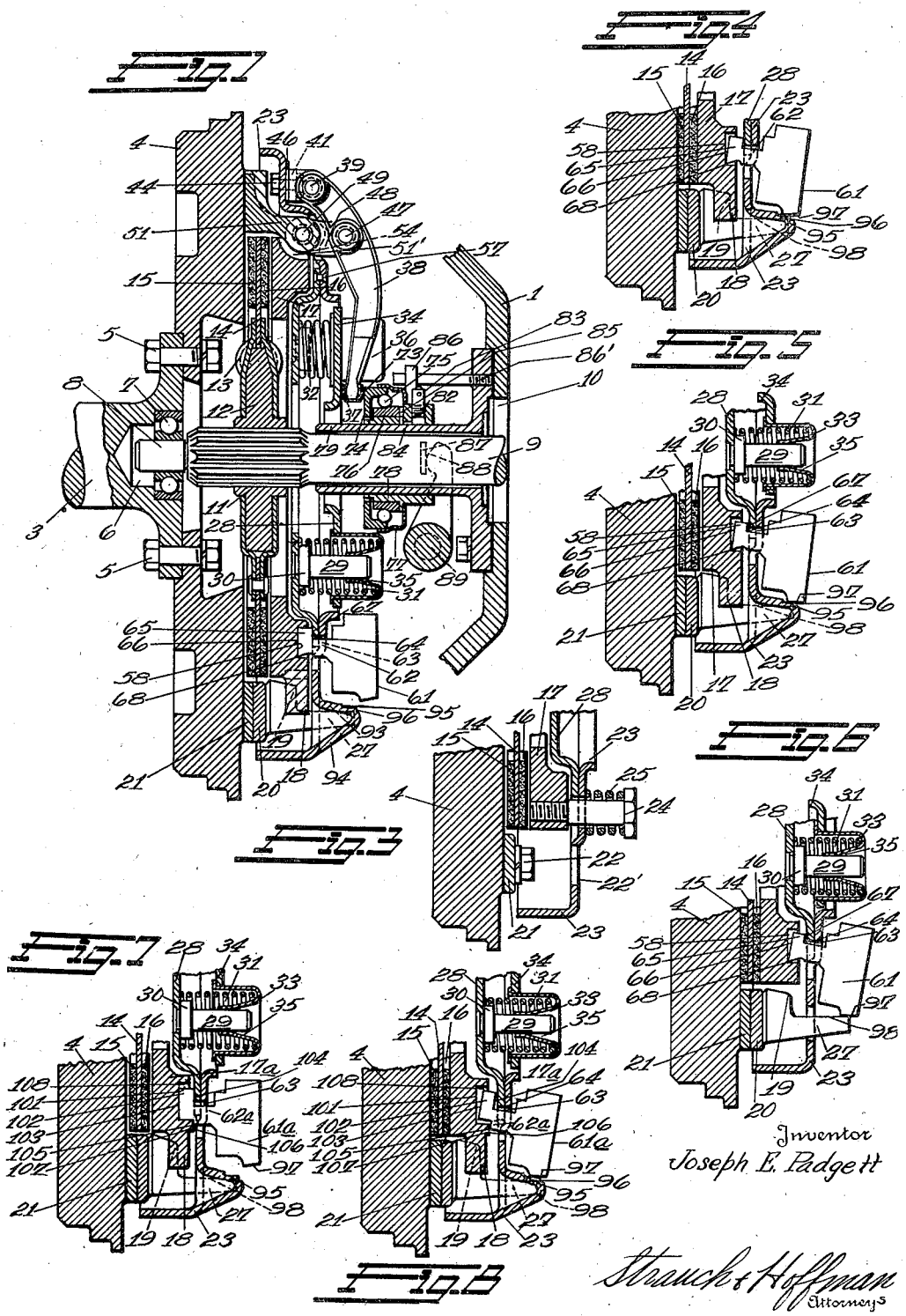

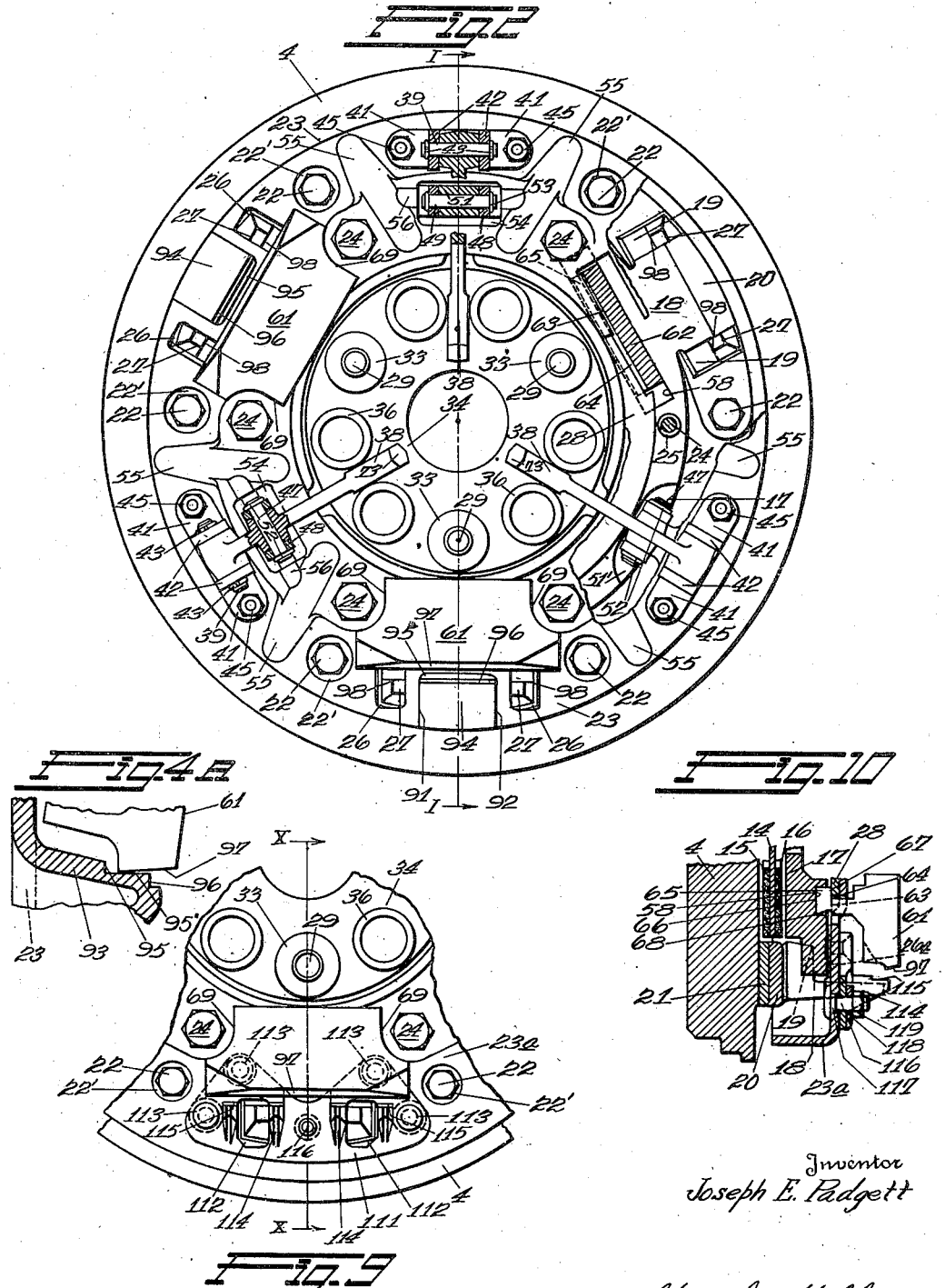

AUTOMATIC POWER TRANSMITTING MECHANISM

Joseph E. Padgett, Toledo, Ohio, assignor to Automatic Drive & Transmission Company, New York, N. Y., a corporation of New Jersey Application April 1, 1933, Serial No. 664,007

22 Claims. (Cl. 192—105)

The present invention relates to mechanisms for automatically transmitting power from a driving member to a driven member when the respective speeds of the latter are properly correlated. More particularly, the present invention relates to automatic clutch mechanisms, and although they have operating characteristics that render them especially useful in automotive or like drives, they may be employed in a wide variety of power transmitting drives.

In my co-pending application, Serial Number 660,179 filed March 9, 1933, I have disclosed an automatic clutch mechanism wherein speed-responsive mechanism causes a driving clutch plate to frictionally engage and drive a driven member when the driving clutch plate is accelerated to a predetermined speed. The speed-responsive mechanism acts upon the driving plate and reacts against a reaction member that is backed up by springs, and is provided with means for limiting the movement of the speed-responsive mechanism in a definite operative position, whereby dynamic balance of the mechanism is assured. As actuation of the speed-responsive mechanism occurs, it reacts against the reaction member and causes pressure to be slowly built up in the springs, and a similar pressure is accordingly slowly built up between the engaging faces of the driving plate and the driven member.

Manually operable mechanism is provided for moving the driving plates away from the driven member against the action of the springs during any phase of clutch operation. Accordingly, when the driving plate and the driven member are disposed in frictional driving engagement under the influence of the speed-responsive mechanism, the driving plate may be manually disengaged from the driven member against the action of the springs, without in any way tending to restore the speed-responsive mechanism to inoperative condition.

In view of the fact that the automatic or speed-responsive mechanism, and the manually operable mechanism operate upon the same driving plate, the mechanism is accordingly compact, simple in design, and low in cost, and in fact manual clutch installations may, in many instances, be changed over into an automatic drive of the type described in my co-pending application with but little effort and expense.

A further highly desirable characteristic of the automatic clutch mechanism just described, is that when the driving plate is brought into frictional driving engagement with the driven member under the influence of the speed-responsive mechanism, the springs associated with the reaction member cause the engagement pressure to build up slowly, with the result that a torque of slowly increasing magnitude is transmitted from the driving plate to the driven member, and the latter is accelerated smoothly and without shock.

A further characteristic of the mechanism just described that renders it extremely flexible and applicable to a wide variety of power transmitting drives, resides in the ease with which it may be manually declutched, irrespective of the speeds of the driving and driven shafts. The manual disengaging or declutching operation produces movement of the driving plate away from the driven member, which merely results in compressing the springs associated with the reaction member, whereas if the declutching operation involved restoring the speed-responsive mechanism to inoperative condition, it would be difficult, if not altogether impossible, to effect manual declutching of the mechanism at high speeds.

The present automatic clutch mechanisms possess the highly desirable structural features and operating characteristics of the automatic clutch mechanism disclosed in my above mentioned co-pending application, and other highly desirable features to be hereinafter pointed out.

It is a primary object of the present invention to provide automatic power transmitting mechanisms for automatically establishing a driving connection between a driving member and a driven member, that are extremely simple in design and low in cost, and yet that are durable and efficiently perform the manifold functions required of them, even under severe operating conditions.

It is another major object of the present invention to devise novel automatic clutch mechanisms having a speed-responsive mechanism for causing the clutch plates to be forced into frictional engagement, that is so designed and related with the parts of the mechanism, that the mechanism smoothly establishes a driving connection between the driving and driven shafts in response to variations in speed of one of the shafts, and that is stable, and dynamically balanced throughout the entire operating speed range of the shafts.

It is another object of my invention to devise, for use with friction clutches embodying clutch plates, a speed-responsive mechanism for forcing the plates into frictional engagement that is provided with restraining means for limiting the action of the speed-responsive mechanism, and thereby limiting the pressure that the latter may build up between the clutch plates, and is provided with further restraining means, that come into play at excessive speeds, to augment the limiting action of the first restraining means.

A further object of the present invention resides in the provision, in automatic clutch mechanism of the type wherein speed-responsive mechanism produces clutch engagement, of means for limiting the action of the speed-responsive mechanism in such manner that the forces set up in the clutch parts and the centrifugal mechanism as the result of restraining the action of the speed-responsive mechanism, are of low magnitude.

Another object of my invention is to provide a clutch mechanism of the type wherein a pair of plate members are resiliently urged apart and act upon a plurality of levers to produce clutch engagement; with novel means for preventing relative rotation of the plate members and at the same time allowing the latter to undergo relative rocking movements, and movements toward and away from each other, whereby an extremely stable mechanism is produced.

It is a further object of my invention to provide, in clutch mechanisms having a driving plate that is urged toward a flywheel or like supporting member by means of a plurality of levers that are pivotally connected to the flywheel; a device for connecting the levers to the flywheel that extends partially within the outer periphery of the driving plate, thereby rendering the mechanism compact.

It is a further object of the present invention to provide, for use in clutches of the type wherein plates are forced together into frictional engagement to produce a driving connection; a novel speed-responsive mechanism for forcing the plates together, and the latter is so designed that it operates with a minimum of friction, whereby a smoothly operating and durable clutch mechanism is obtained.

A still further object of my invention resides in the provision, for use in friction clutches, of a novel speed-responsive mechanism comprising a plurality of elements having portions that act against one of the clutch plates and react against a reaction member during their operation, and are so designed that they cooperate with the driving and reaction plates with a minimum of friction at all times.

Another object of the present invention is to provide novel mechanism for causing the driving and reaction plates, of an automatic clutch mechanism of the type wherein centrifugally operable elements operate to produce clutch engagement, to rotate synchronously with a flywheel-like supporting member, and which also functions to limit actuation of the centrifugally operable elements.

Another object of my invention is to provide an improved reaction member for use in automatic clutch mechanisms.

Further objects of my invention will become apparent as the specification proceeds in connection with the annexed drawings, and from the appended claims. In the drawings, Figure 1 is a longitudinal sectional view of an automatic clutch mechanism forming part of my invention and is taken on the line I—I of Figure 2.

Figure 2 is a view of the automatic clutch mechanism shown in Figure 1 as it appears when viewed from the right-hand side of that figure with certain parts removed, and certain other parts broken away in order to more clearly illustrate the structure involved.

Figure 3 is a fragmental sectional view illustrating one of the retracting spring assemblies employed in the mechanism shown in Figure 1.

Figure 4 is a fragmental sectional view of the lower part of Figure 1 and illustrates the weight there shown in its limiting position against its primary stop and the clutch plates engaged.

Figure 4A is an enlarged section view similar to Figure 4, and shows the parts in the positions they assume as the weights initially contact their primary stop faces.

Figure 5 is a view similar to Figure 4, but illustrates the mechanism manually declutched.

Figure 6 is a view similar to Figure 4, but illustrates the weight in its limiting position against its secondary stop.

Figure 7 is a fragmental sectional view of the clutch mechanism illustrated in Figure 1 as it appears when provided with a modified form of speed-responsive mechanism that also forms part of my invention.

Figure 8 is a view similar to Figure 7, but illustrates the weight in position against its primary stop and the plates engaged.

Figure 9 is a fragmental view of the mechanism shown in Figure 2 of the drawings as it appears when provided with a modified form of primary stop organization, and, Figure 10 is a sectional view taken approximately on the line X—X of Figure 9.

Referring to the drawings, wherein like reference characters refer to like parts throughout the several views thereof, my automatic clutch mechanism is preferably enclosed in a clutch housing that is illustrated as broken away and is designated generally by the reference character 1.

A driving shaft 3 is adapted to have rotational efforts applied to it by a suitable prime mover in any desired manner, and in the present instance it is shown as constituting the crank shaft of an internal combustion engine. The end of the shaft 3 is secured to a flywheel 4 by bolts 5, or in any other suitable manner. Bolts 5 extend through aligned apertures in the flywheel and the flange provided on the end of shaft 3, and have nuts turned thereon.

Shaft 3 is further provided with a bore 6 in which is carried a bearing assembly 7 for supporting the reduced end 8 of a clutch shaft 9. The rear end of shaft 9 is adapted to be journaled in a bearing assembly (not shown) that is preferably located in recess 10 in housing 1.

A hub 11 is splined upon shaft 9 and is provided with a flange 12. Operatively secured to flange 12, by means of rivets or the like, is a vibration dampener designated generally by reference character 13 which provides a resilient driving connection between hub 11 and a driven disc 14. This vibration dampener is employed to dampen out any torsional vibrations that may be set up in the crank shaft of the engine, and in view of the fact that it forms no part of the present invention, it will not be further described.

Facings 15 and 16 are secured to opposite sides of disc 14 near its periphery, and they may consist of any material that has the required characteristics to give the correct frictional gripping force, and at the same time has wearing qualities adapting it for this purpose. I prefer, however, to use the types of material which in practice have given very satisfactory results in an automatic slipping drive and clutch mechanism of the "Powerflo" type. Frictional facings 15 and 16 may be secured to disc 14 in any suitable manner, as for instance by rivets or the like, and they, along with disc 14, will be hereinafter referred to as the driven member.

Facing 15, secured to disc 14 cooperates with the flat driving face of flywheel 4 and is adapted to be frictionally driven thereby. Facing 16, cooperates with a plate 17, which will be hereinafter termed the automatic plate for the reason that it is automatically actuated and is adapted to engage and clamp the driven member between it and the flat face of the flywheel. Plate 17 is of substantial thickness so that it may possess a sufficient degree of rigidity to prevent distortion and warpage thereof under the pressures that it is subjected to during operation of the mechanism.

Plate 17 is driven by flywheel 4, and is permitted to move axially thereof for clutching and declutching purposes, by means of lugs or ears 18 formed thereon, (Figures 1 and 2) which are disposed at preferably 120° intervals about the periphery of plate 17. Each lug 18 is disposed between and cooperates with a pair of bosses 19 formed on a bracket member 20, seating on a ring member 21. Brackets 20 and ring members 21 are secured to the flywheel by means of cap screws 22.

Although I prefer to key automatic plate 17 to the flywheel in this manner, it is to be understood that instead of forming lugs 18 thereon, automatic plate 17 may be provided with recesses into which portions of the saddle members extend, if desired.

Disposed parallel to automatic plate 17, and also mounted for rotation with flywheel 4, is a plate 23, that is flanged at its inner and outer peripheries to render it comparatively rigid. Plate 23 will hereinafter be termed a reaction plate because it takes the reaction of the automatic mechanism in a manner presently to be described. Reaction plate 23 is provided with apertures 22', through which a wrench or other tool may be inserted for manipulating cap screws 22.

Automatic plate 17 and reaction plate 23 are urged toward each other by means of pairs of holdback or retracting bolts 24 that are threaded into automatic plate 17 and slidably fit in apertures in reaction plate 23. Bolts 24 are encircled by compression springs 25 which seat at one end directly against the reaction plate, and at the other end react against the heads of bolts 24. Bolts 24 are preferably arranged in pairs, that are spaced at approximately 120° intervals about the periphery of plates 17 and 23, and are disposed closely adjacent the weight assemblies so that the forces set up in plate 23 as the result of operation of the latter, does not set up any plate-bending tendencies that would be present if the holdback assemblies were disposed substantially mid-way between the weight assemblies. It is to be understood, however, that more or less than six properly designed holdback assemblies may be used without departing from the spirit of my invention. Automatic plate 17 is keyed to rotate with flywheel 4, and bolts 24 therefore function to cause the reaction plate to rotate with or also be driven by automatic plate 17 and flywheel 4, and when bolts 24 are properly designed, this keying means is entirely satisfactory. I preferably, however, employ additional means for keying the reaction plate directly to plate 17 for the purpose of increasing the stability of the mechanism, and this structure will now be described.

Pairs of apertures 26 are provided in plate 23 and brackets 20 are provided with spaced fingers 27 that are slidably received in them. Fingers 27 lie in driving engagement with the walls of apertures 26 at all times and accordingly cause plate 23 to be driven by the flywheel, and at the same time permit it to undergo axial movements.

Reaction plate 23 and automatic plate 17 are normally urged toward the flywheel by means of a spring assembly preferably consisting of a plurality of springs interposed between a pair of annular members. To this end, a second reaction disc or plate 28 is disposed in overlapped relation with plate 23 and a plurality of springs act upon it. Plate 28 is made of sheet metal suitably formed, and it is hardened for the purpose of enabling it to cooperate the centrifugal mechanism with a minimum of friction and wear, in the manner to be presently described.

Plate 28 is provided at preferably 120° intervals around its periphery with combined spring retainers and guide members 29, having flanges 30 formed thereon, which are adapted to center one end of springs 31. Members 29 have reduced portions that extend through apertures in plate 28 and are swaged over to hold members 29 in place with flange 30 abutting plate 28. Disposed on either side of members 29, and the springs associated therewith, are springs 31 that are held in position on plate 28 by means of spring retainers 32. Retainers 32 are preferably constructed of sheet metal and are inserted in apertures in plate 28 and flanged over to hold them in place. The other ends of the springs 31 that are associated with members 29 are received in, and bear against the bottom of a plurality of flanged cup members 33, which are located in suitable apertures in a plate 34. Cup members 33 are provided with guiding lip portions 35 that embrace and are disposed in slidable engagement with the shank portions of members 29. Lip portions 35 are given the configuration shown, (Figure 1) so that cup members 33 can not only slide upon, but are capable of tilting with respect to guide members 29, and the purpose of this structure will appear hereinafter. Plates 28 and 34 are accordingly caused to rotate in synchronism by members 29 and yet may undergo relative axial and tilting movement. The springs 31 that are associated with retainers 32 are received in and bear against the bottom of flanged cups 36 located in apertures in plate 34. As best shown in Figure 2, cup members 36 do not have pins 29 associated therewith as is the case with cup members 33. The rear face of plate 34 bears against and cooperates with curved faces 37 formed on levers 38. Levers 38 are preferably three in number, so that plate 34, in response to the action of springs 31 is urged into a stable position on a three-point support, and is thereby caused to exert an equal pressure upon each lever regardless of slight inaccuracies of the levers, holding them tight at all times.

The outer end of each lever 38 is journaled on a pin 39, which in turn is secured in a saddle member 41 having an upturned pair of apertured lugs or ears 42 formed thereon. Pins 39 are secured against rotation and axial displacement in lugs 42 by means of split rings 43 (Figure 2), that are sprung into grooves in pins 39 and frictionally bear against the ears formed on saddle members 41. This insures oscillation of levers 38 upon pins 39 and prevents oscillation of the latter within lugs 42.

Saddle members 41 are secured to the face of reaction plate 23 by means of bolts 44 and nuts 45, cooperating with apertures formed in plate 23. Before saddle members 41 are applied to the face of plate 23, a plurality of adjustment shims 46 are preferably interposed between them and plate 23, for a purpose that will presently appear.

Each lever 38 is apertured intermediate its ends, and is provided with a pin 47 upon which the outer ends of a pair of link members 48 are secured. The other ends of each pair of links 48 are provided with a pin 49 rigidly secured therein and which is journaled in a saddle member 51 preferably formed as an integral part of ring member 21. Although I prefer to construct saddles 51 integrally with the ring member, it is to be understood that they may be separately formed and individually secured to flywheel 4 if desired. As seen in Figure 1, saddle members 51 extend partially within the periphery of automatic plate 17, and the latter is provided with recesses 51' to permit automatic plate 17 to move freely without interference from saddles 51.

Pins 47 and 49 are preferably secured in place in links 43 by split rings 52 and 53 sprung into grooves in pins 47 and 49 respectively, but they are not wedged in place as described in connection with rings 43. Links 48 extend through suitable apertures 54 formed in reaction plate 23. Plate 23 is preferably stiffened or reinforced against flexing in the region of the lever and saddle assemblies by means of radial dished out portions 55, and chordal dished out portions 56, that are formed by suitable stamping or pressing operations.

Reaction plates 23 and 28 form in effect a single reaction member and are secured together by means of rivets 57 or the like, and are urged toward the flywheel by the direct pressure of springs 31, and are further urged toward the flywheel by the other ends of the springs 31, which, reacting through plate 34 and levers 38, exert an amplified force upon plate 23. Springs 31, however, are normally restrained from moving reaction member 23 and automatic plate 17 toward the flywheel, when the prime mover is operating at a predetermined idling speed, by means of a throwout mechanism that operates on levers 38, and which will be presently described.

In view of the fact that the outer ends of levers 38 may be adjusted toward and away from reaction plate 23 by inserting or withdrawing shims 46, proper parallel relationship of the clutch parts may be brought about by inserting or withdrawing shims from the proper saddle assemblies. It is contemplated that the shim adjustment shall be primarily in the nature of an initial factory adjustment for the reason that, when the clutch mechanism is in use, there is no tendency for automatic plate 17 and reaction members 23 and 28 to work themselves into non-parallel relation with flywheel 4, because the wear that does occur on the face of each lever 38, as the result of operation, will occur to an equal extent on each of them because they are acted upon by an equal force, namely, one-third of the total pressure exerted by springs 31 due to the three-point nature of the connection existing between the plate 34 and the levers. The curved portions 37 and 73 of levers 38 are preferably of spherical configuration, so that they may cooperate with plate 34 and ball race 74 with a minimum of noise and friction.

The preferred speed-responsive, or centrifugally operable actuating mechanism will now be described. The rear face of automatic plate 17 is provided with preferably three symmetrically arranged, seat-forming recesses 58 which are preferably rectangular in cross section, and which provide flat bottom faces against which the automatic or centrifugal weights fulcrum and act to cause clutch engagement. Centrifugally operable weights, designated generically by reference character 61, are preferably three in number, and are symmetrically disposed between the lever and saddle assemblies. Each centrifugal weight is provided with a lever section 62, which is of substantial width and extends through an aperture 63 formed in plate 23, and a recess 64 formed in plate 28, that are aligned as seen in Figures 1 and 2. Lever sections 62 carry heads 65 at their extremities, each of which is provided with a flat face 66 that normally abuts the bottom face of its recess 58 in plate 17 when driving shaft 3 is operating at idling speeds or is stationary. Heads 65 are also provided with a reaction face 67, which abuts the face of reaction plate 28 at all times, and is designed for fulcrumming engagement therewith during operation of the weights. The surface of plate 28 that cooperates with the faces 67 of weight-heads 65 is preferably ground and polished so that relative sliding movement thereof may occur with a minimum of friction.

Heads 65 have their outer sides relieved to provide knife-like edges 68 which are adapted to rotate or pivot in the dihedral angles defined by the bottom and outer faces of recesses 58 formed in automatic plate 17. The relieving operation enables a good knife edge 68 to be formed on each weight-head, and allows pivotal movement thereof without interference from the outer side walls of recesses 58. However, it is to be understood that unrelieved weights may be employed in recesses that are suitably designed so as to have relieved outer side walls, if desired. It is also to be understood, that instead of providing individual recesses 58 for cooperation with the weight-heads, a single annular groove, as shown in my co-pending application, may be formed in automatic plate 17, if desired, without departing from the spirit of the present invention.

Recesses 58 are formed in automatic plate 17 in any desired manner, as for instance by a milling cutter or the like, and weight-heads 65 are prevented from moving longitudinally within recesses so formed, by the engagement of the walls of apertures 63 and recesses 64 formed in plates 23 and 28, with the sides of levers 62. Knife edges 68 are adapted to cooperate with the flat bottom faces of recesses 58 and thereby act in line contact upon plate 17 for a substantial distance across the face thereof, whereby uniform distribution of pressure around the entire area of the automatic plate is effected. Each weight 61 is further provided with recesses 69 which allow free operation thereof without interference from holdback bolts 24.

The seats formed by the bottom and outer faces or walls of recesses 58 constitute bearing recesses in which edges 68 of weight-heads 65 are adapted to fulcrum.

The mass of weights 61, and the number employed in a particular installation, is determined by a consideration of the required pressure that they must transmit under the desired speed conditions to urge the clutch plates into final non-slipping engagement. In the automatic drive clutch mechanism shown, three equally spaced weight assemblies are preferably employed.

When shaft 3 is stationary, or is operating at a speed corresponding substantially to the idling speed of the prime mover employed to drive it, the parts assume the position in which they are shown in Figure 1. Heads 65 of weights 61 are clamped between plates 17 and 28, under the influence of springs 25 acting against plate 23 and holdback bolts 24, and plate 23 is held in the position shown, against the action of springs 31, by means of a throwout mechanism that will now be described.

Cooperating with curved faces 73 formed on levers 38 is the flat face of a ball race 74, which cooperates with anti-friction balls 75 disposed between race 74 and a cooperating ball race 76. Ball races 74 and 76 are held in assembled relation with respect to each other by means of a combined retainer and reservoir defining member 77. Ball race 76 is rigidly mounted upon a sleeve 78 which is slidably mounted upon a hollow supporting member 79. The latter is preferably flanged and bolted to housing 1 and is accurately machined to be disposed in axial alignment with the clutch mechanism and prime mover shaft 3 when the clutch is assembled, and is designed to provide a close sliding fit with sleeve 78. Member 79 is preferably spaced substantially from, and is independent of shaft 9. Sleeve 78 is provided with a tapped hole 82 into which a grease fitting 83 of well known construction is screwed. Bore 82 communicates with an axially extending passage 84 formed in sleeve 78 so that lubricant introduced through bore 82 provides lubrication for axial movements of sleeve 78 and also provides lubrication for the bearing assembly through a passage 85 communicating with passage 84 and reservoir defining member 77 associated with the bearing assembly.

Sleeve 78 is prevented from rotating about support 79 by means of an apertured lug 86 formed on sleeve 78. A stud 86' is slidably received in lug 86 and is threaded into an aperture in support 79. Formed on opposite sides of sleeve 78 are lugs 87 which cooperate with throwout fingers 88 rigidly carried by a throwout shaft 89. Shaft 89 is preferably journaled in, and extends outwardly of clutch housing 1 and carries on the end thereof a clutch pedal, (not shown) which is secured against rotation thereon.

Although I have disclosed a specific throwout assembly in connection with my invention, it is to be understood that any suitable throwout mechanism having a face that is normal to the clutch axis for cooperating with the inner ends of levers 38 may be employed, if desired, and a thoroughly practical mechanism obtained.

Before proceeding to further structure, it should be observed that driven shaft 9 is entirely clear of supporting sleeve 79, the latter being stationarily mounted in the clutch housing or casing. Therefore, substantial eccentric, or angular misalignment of driving shaft 3 and driven shaft 9 can have no effect whatever upon the operation of the throwout bearing assembly and its cooperation with levers 38. Moreover, since driving shaft 3 is the crank shaft of the engine, and the bearing face of the support 79 is carefully machined to lie disposed exactly parallel to driving shaft 3, their permanent alignment is assured and the throwout bearing assembly, providing springs 31 are properly assembled, causes plates 17 and 23 to be disposed in parallel relation to the flywheel face at all times, regardless of whether the clutch is engaged or disengaged. Moreover, levers 38 will be held tight at all times, regardless of manufacturing inaccuracies, or inaccuracies that arise due to wear, by the three-point support on the face of the throwout bearing assembly while the throwout bearing is positively maintained in proper alignment by virtue of the stationary guiding means secured to the clutch housing, providing smooth clutch action with minimum pedal operating pressures at all times in a low cost construction requiring a minimum of manufacturing accuracy.

It should furthermore be noted that the entire absence of an obstructing rim on the flywheel, and of the usual cover or any other structure associated with the clutch mechanism that might impede air flow induced by the rotation of the clutch elements or inhibit free radiation of heat therefrom, and also the plane face of the flywheel beyond the driving face thereof, provides for the rapid dissipation of heat from the clutch elements by radiation and convection. There is no tendency for the parts to overheat and possibly draw the temper of springs 31, because the retaining members associated with the latter allow free circulation of ventilating air currents about springs 31. As the facings 15 and 16 wear, particles of solid lubricant and dust dislodged therefrom are free to leave the clutch mechanism and be carried away by the air stream induced by rotation of the clutch elements.

The absence of the usual rim on the flywheel moreover materially reduces machining and production costs and adapts the mechanism readily to large volume, low cost production methods.

Clutch pedal shaft 89 is preferably adjustably held by a suitable mechanism in such a position that the throwout bearing assembly will hold the parts in the positions in which they are shown in Figure 1 when driving shaft 3 is stationary or is operating at a predetermined idling speed of the prime mover utilized therewith. Under these conditions, a clearance exists between the plates and there is accordingly no driving connection between shafts 3 and 9. Any suitable latch mechanism may be associated with shaft 89 or the clutch pedal for holding shaft 89 in this position, but I preferably employ the type of clutch pedal latch mechanism disclosed in my copending application, and which may be referred to for a full disclosure thereof. The throwout bearing assembly is shown in Figure 1 in what is termed its "automatic position", and is so termed because it is preferably disposed in this position when the clutch mechanism functions, or is being employed as an automatic or speed-responsive clutch.

The clutch pedal may be depressed to move the throwout bearing assembly to the left of the position shown in Figure 6, for manually declutching the mechanism in a manner to be hereinafter pointed out, and the parts of the latch mechanism are so designed to allow this movement of the pedal without interference.

The latch mechanism may be operated to allow the clutch pedal to retract and permit the throwout bearing to move to the right of the position illustrated in Figure 1 into what is termed its manually engaged position, and this operation will be further amplified as the specification proceeds.

With the throwout mechanism disposed in automatic position, the speed-responsive, or automatic operation of the mechanism is as follows:

Automatic operation

As driving shaft 3 and flywheel 4 are accelerated, weights 61 gradually swing or rock outwardly about their knife-edges 68 as axes in response to centrifugal force. As this occurs, reaction faces 67 of heads 65 fulcrum and slide on the face of plate 28 (which is preferably hardened to give it good wearing qualities), and knife-edges 68, by virtue of their engagement and fulcruming action upon the flat bottom surfaces of recesses 58, in automatic plate 17, force automatic plate 17 away from reaction plates 23 and 28 against the action of hold-back springs 25, and into engagement with facing 16 of disc 14, on a three-point support, thus causing disc 14 to move axially and bring the facing 15 thereof into contact with the flywheel face. After the driven member is thus clamped or gripped between automatic plate 17 and flywheel 4, further rocking movement of weights 61 causes faces 67 of heads 65 to force reaction plates 23 and 28 away from the flywheel against the action of springs 31. Accordingly, as weights 61 swing outwardly and bring the driving and driven members into clutching engagement, reaction plates 23 and 28 are forced away from the flywheel against the action of springs 31 and a yielding or resilient engaging pressure is established between the plates. In view of the resilient nature of the backing means for the reaction member, should certain weights 61 swing further outwardly than the remaining weights, the pressure exerted thereby will nevertheless be uniformly distributed about the periphery of plate 17 for the reason that the reaction plates can tilt or float, and take a slight angular position with respect to automatic plate 17, due to the fact that the sole movement limiting means of the reaction member is constituted by springs 31, and the guiding members 29, that are designed to permit tilting of plate 28 in this manner.

A power transmitting coupling is thus automatically established between the driving and driven members, and when shaft 3 attains a speed that is predetermined by the design of the mechanism, the parts appear as they are seen in Figure 4 of the drawings. Referring to this figure, the centrifugal weight there shown is disposed in its outermost position, and automatic plate 17 and reaction plates 23 and 28 are shown in their separated positions, at which time driven member 14, carrying faces 15 and 16, is clamped securely between automatic plate 17 and flywheel 4, and the pressure urging them into contact under these conditions is such that they are in non-slipping engagement, thus providing a positive friction coupling between shafts 3 and 9. Under these conditions, weights 61 lie in contact with stop members that will now be described.

Plate 23 is shaped or formed to provide depressed portions, each of which consists of substantially parallel end walls 91 and 92 that are connected with sloping walls 93 and 94. Walls 93 are provided with a pair of angular recesses 95 and 96. Recesses 95 provide faces normal to the axis of the mechanism and faces 95' that are parallel to the axis of the mechanism. The latter faces constitute stops against which faces 97 formed on weights 61 are adapted to seat when the flywheel is rotating above the automatic engaging speed of the mechanism. The parts are illustrated in the positions they take under these conditions in Figures 4 and 4A. When the weights are retracted, faces 97 are inclined at an angle of approximately eight degrees to the axis of the mechanism so that when the weights tip or rock, their faces 97 initially contact, and come almost into surface engagement with faces 95' (Figure 4A). As the speed further increases, the reaction member deflects slightly under the influence of the increasing forces exerted by weights 61, and faces 97 come into full surface engagement with reaction plate, stop faces 95'. Under the latter conditions, there is no angle between faces 97 at their stopping points that tend to make the weights slide to the right, and which would possibly result in relieving the plate pressure and allowing slip.

Recesses 95 and 96 are accurately machined to provide two surfaces which come together in one line, so that the position of this line can be accurately held, both as to its distance from its center line of the shaft, and also its distance out from the bottom of its corresponding recess 58 in the automatic plate.

This weight-movement limiting structure not only assures proper positioning of the weights in their engaged or outer positions, to secure substantially perfect dynamic balance of the mechanism, but insures application of the forces exerted by the weights to the reaction plate in directions that are substantially radial or normal to the axis of the mechanism, or parallel to the plane of the reaction plate. This greatly reduces the tendency of reaction plate 23 to undergo harmful distortion under the influence of the weights at high speeds.

The parts are preferably so designed, that when they assume the positions shown in Figure 4, the centers of mass of weights 61 will lie in a plane normal to the axis of the mechanism and passing through the point of contact of weights 61 with their stop edges. By designing the parts in this manner, there is no tendency for weights 61 to rotate about their stopping points as axes in response to centrifugal force, and there are accordingly no distorting stresses set up in them, nor does the mechanism exhibit declutching tendencies.

Angular recesses 95 and 96 are cut in walls 93 in order to accurately position the stop faces with respect to plate 23. I preferably construct the reaction plate in this manner for the reason that if stop faces were formed or "crimped" therein by a quantity production, die-forming process, the sheet metal would possibly undergo a slight distortion after it was relieved of the die-forming pressures, with the result that the stop faces would be disposed slightly out of the desired positions. It is to be understood, however, that this latter method of providing the reaction plate with stops is embraced by the present disclosure and the appended claims.

When the speed of the flywheel attains a predetermined value, and weights 61 have accordingly produced a predetermined deflection of plate 23 in response to centrifugal force, further movement of weights 61, and consequent further resilient deflection of plate 23 is arrested by means of mechanism that will now be described.

In order to augment the weight-movement limiting action of the reaction plate stops at extremely high speeds, I preferably provide fingers 27 with faces 98, that are adapted to be contacted by faces 97 of weights 61, as seen in Figure 6. The reaction plate stops are adequate to stop the weights during most all operating conditions met with in practice and therefore the parts appear as they are seen in Figure 4 during most automatically engaged clutch conditions. When the flywheel is rotated at excessive speeds, weights 61, which have already moved into contact with the reaction plate stops, rock further outwardly under the influence of the increased centrifugal force and bring their faces 97 into contact with faces 98 of fingers 27, as seen in Figure 6.

Fingers 27 are therefore auxiliary or emergency stop members, because they come into play only under extreme conditions, and they may in fact be dispensed with if the reaction plate and the reaction plate stop members are so designed to properly restrain the action of the weights under all operating conditions met with in the particular drive involved, and it is to be understood that this organization is embraced by the present invention. On the other hand, it is contemplated that under some conditions, depending upon the particular factors influencing the design, the reaction plate stops may be omitted from the mechanism, and the flywheel supported stops relied upon to stop the weights throughout all phases of operation of the mechanism, and this structure is also intended to be embraced by the appended claims.

As the prime mover accelerates, centrifugal weights 61 swing outwardly and cause the driven member to be clamped between the automatic plate and the flywheel in the manner just described. Movement of automatic plate 17 away from reaction member 23 is opposed by holdback springs 25 and therefore weights 61 are held under control. Holdback springs 25, therefore, in addition to predetermining the speed of the mechanism at which automatic engaging operation is initiated, exert a steadying influence upon the clutch parts. As weights 61 rock further outwardly, they react against plate 23 to cause pressure to be gradually built up in springs 31 and this gradual building up of pressure causes the torque that is transmitted from shaft 3 to shaft 9 to gradually increase in magnitude, and gives the mechanism smooth operating characteristics.

When the automatic engaging operation just described is being effected, reaction plates 23 and 28, and their associated parts are moved to the right of the position shown in Figure 1. Movement of reaction plate 23 to the right causes the inner ends of levers 38 to move from their cooperating engagement with the face of ball race 74, thereby relieving the throwout bearing assembly of pressure. The throwout bearing assembly therefore only operates when the clutch is operating at idling speeds or is manually declutched and therefore receives only a minimum amount of wear and its life is therefore greatly increased.

With the above described mechanism installed in a motor vehicle provided with a conventional three-speed transmission, and the vehicle is on a substantially level surface, the transmission may be placed in high gear, if the engine is operating below the engaging speed of the clutch mechanism, and the engine may be accelerated to produce automatic clutch engagement in the manner previously described. During the engaging operation, a slipping drive exists between shafts 3 and 9 and the vehicle is accelerated smoothly and without shock and in view of the speed-responsive engaging characteristics of the mechanism, it is impossible to stall the engine through improper actuation of the accelerator. When the engine and vehicle speeds are properly correlated, the clutch plates are brought into full driving engagement, thereby establishing a direct coupling between shafts 3 and 9.

When operating in this manner, and it is desired to decelerate or stop the vehicle, the accelerator is released and the brakes are applied. When the vehicle has decelerated to a speed corresponding substantially to engine idling speed, through the combined braking action of the engine and the vehicle brake mechanism, weights 61 rock inwardly under the influence of holdback springs 25 and disengagement of the clutch plates is automatically effected. Shafts 3 and 9 are thereby automatically uncoupled and the braking action of the engine is no longer transmitted to shaft 9, but in view of the fact that the disengaging speed of the clutch mechanism is fairly low, the vehicle is decelerated to a relatively low speed under the braking influence of the engine before the mechanism automatically disconnects shafts 3 and 9.

The vehicle may be brought to a complete stop by continued application of the brakes, or, if traffic conditions permit, the accelerator may be depressed and the engine accelerated to produce almost immediate re-engagement of the mechanism and the vehicle again picked up in high gear.

Due to its slipping drive characteristics, the present mechanism constitutes a drive mechanism as well as a clutch, and while it does not multiply the torque delivered from shaft 3 to shaft 9, it permits the engine to operate at a higher speed and, consequently, on a higher point on its speed-torque curve, and deliver more power, than if substantially non-slipping conditions existed between shafts 3 and 9, and this feature, in combination with the lubricated facings, and self-cooling characteristics of the present mechanism, renders it entirely feasible to operate a vehicle in which it is incorporated in high gear under normal conditions.

As previously explained, the latch mechanism is adjusted to hold the parts in the positions shown in Figure 1 of the drawings when the prime mover is operating at idling speed or is stationary. When the facings have become thin as the result of particles thereof wearing away during operation, and cause the idle release plate clearance to become too great, the throwout bearing assembly is moved slightly to the right of the position in which it is shown in Figure 1, by adjusting the clutch pedal on its shaft, or adjusting the latch mechanism in any suitable manner, in order to dispose automatic plate 17 closer to the flywheel and establish proper plate clearance for idle release conditions. When facing-wear has been compensated for by moving the throwout bearing assembly further to the right several times, levers 38 may be allowed to move to the right to such an extent under some conditions, that the pressure built up in springs 31 in response to actuation of the speed-responsive mechanism is not correct for proper clutch operation. This condition is readily remedied, or compensated for, by inserting sufficient shims 46 under saddles 41 to move the reaction member relatively to the levers so that the latter may be brought into the positions shown in Figure 1. Proper idling clearance is then established between the plates by adjusting the throwout bearing assembly to the left into contact with the inner ends of levers 38 in the manner previously explained. The mechanism may accordingly be adjusted to compensate for wear of the facings without in any way disturbing the rate of pressure build-up, and consequently the operating characteristics of the mechanism are not changed

Manual disengaging operation

When the plates have been automatically brought into full driving engagement in the manner previously described, the clutch pedal may be depressed to displace the throwout bearing assembly and the inner ends of levers 38 to the left of the positions in which they are shown in Figure 1. Movement of levers 38 in this manner causes them to fulcrum about and react against pins 47 and withdraw the reaction plates away from the flywheel. Withdrawal of the reaction plates produces withdrawal or disengagement of automatic plate 17 from the driven member because plates 17 and 23 are held in unitary relation by the holdback assemblies. If the engine speed is maintained above the predetermined engaging speed during the manual declutching operation, weights 61 remain in their outermost positions; therefore, the declutching operation does not involve retracting the weights against the action of centrifugal force, which, at high speeds, might be sufficiently high to preclude affecting the manual declutching operation.

In traffic, when it is desired to get the vehicle away quickly, and in starting up steep grades, the clutch pedal may be operated in this manner to disengage the plates for gear shifting purposes as in a vehicle provided with a manually operable clutch. The clutch pedal may also be operated to produce manual engagement of the plates, (if the engine is operated above the engaging speed of the mechanism) in a manner similar to a manual clutch for maneuvering the vehicle into and out of parking positions or for navigating in heavy traffic.

Manual engaging operation

As has been previously pointed out, when shaft 3 is operating substantially at the idling speed of the prime mover, or is stationary, and the clutch pedal is latched to dispose the throwout bearing in the automatic position shown in Figure 1, a clearance exists between the clutch plates, and shafts 3 and 9 are accordingly disconnected. When it is desired to establish a driving connection between shafts 3 and 9 under these conditions, the latch associated with the clutch pedal is actuated to allow the latter to move into its retracted position. Retraction of the clutch pedal allows the throwout bearing assembly to move to the right under the influence of springs 31, and the latter, acting through levers 38, bring reaction plates 23 and 28 and automatic plate 17 to the left of the positions in which they are shown in Figure 1, with automatic plate 17 in driving engagement with the driven member, thereby coupling shafts 3 and 9.

With the above described mechanism installed in a motor vehicle, it is frequently desirable to effect this manual engaging operation. For instance, when the motor is cold and the battery is low, it is desirable to place the transmission in gear and push or coast the vehicle to turn the engine over. Also when stopping on a steep grade, positive engagement of the clutch, with the transmission placed in low or reverse gear, provides an emergency brake that cannot be inadvertently released; or if the motor stalls, from lack of fuel or any other cause, the vehicle can pull out of dangerous positions by propelling it in low gear with the starting motor.

Although I have disclosed, and prefer to employ a reaction member that is made up of two plates 23 and 28, that overlap and provide a stiffened or re-enforced area for taking the reaction of the automatic weights without undergoing harmful distortion, it is to be understood that the reaction member may be constructed of a single plate member, that is so designed as to provide sufficient rigidity, without departing from the spirit of the present invention. On the other hand, a single sheet metal plate may be "crimped" or folded upon itself in the region where the weights cooperate with it in order to reinforce it against flexing, or separate pieces may be secured to the plate for performing this function, and the latter may be suitably hardened and polished to enable them to cooperate with faces 68 of weights 61 with a minimum of friction and attendant wear.

Referring now to Figures 7 and 8 of the drawings, I have illustrated the clutch mechanism shown in Figure 1 provided with a modified form of speed-responsive or centrifugally operable mechanism.

In this form of my invention automatic plate 17a is provided with a plurality of recesses 101 that cooperate with the heads 102 of centrifugal weights 61a. When the flywheel is operating at idling speeds, or is stationary, the parts assume the positions shown in Figure 7, with the flat faces 103 of heads 102 in engagement with the bottom faces of recesses 101. Heads 102 are retained in recesses 101 under these conditions by the holdback springs acting through reaction plates 23 and 28, and the reaction faces 104 provided on heads 102. Heads 102 are also provided with knife-like edges 105 that cooperate with the flat faces 106 of bosses 107 that are preferably integrally formed on automatic plate 17a adjacent recesses 101. The parts are so designed that when they are disposed in the positions shown in Figure 7, faces 106 of bosses 107 lie in substantially the same plane as the faces 104 provided on weight heads 102 for reasons that will more fully appear hereinafter.

When the flywheel is accelerated to speeds substantially above idling speed, weights 61a rock outwardly about their edges 105 as fulcrums in response to centrifugal force and their faces 104 react against the faces of reaction plate 28 and clutch engagement is automatically effected in the manner described in connection with the first form of my invention, and the parts are shown in full driving engagement in Figure 8. Recesses 101 are designed to provide spaces 108 to allow the weights to freely rock into the position shown.

When weights 61a rock outwardly in this manner about their edges 105 as axes, reaction faces 104 of heads 102 slide on the surface of plate 28. This relative sliding movement is small however because when weights 61a start to rock, the face of plate 28 is disposed in the same plane as axes 105 of the weights, and reaction faces 104, and the surface portion of plate 28 contacted by them, move substantially parallel to each other throughout the entire operation of the weights in view of the fact that the angular movement of the latter is small. Stated in another manner, the surface portions engaged by reaction faces 104 when the parts assume the positions shown in Figure 7, are not spaced substantially from those contacted by reaction faces 104 when the parts are disposed in the positions shown in Figure 8.

The outer walls of recesses 101 cooperate with the outer sides of heads 102 and levers 62a to retain the weights in proper assembled relation at all times. Although I prefer to integrally form bosses 107 on plates 17a, it is to be understood that they may be dispensed with and a plurality of individual plate or bracket members secured to the face of plate 17 for cooperation with heads 102, if desired, without departing from the spirit of my invention.

Referring to Figures 9 and 10 of the drawings, I have illustrated a different form of reaction plate stop member organization in combination with the automatic clutch mechanism shown in Figure 1.

With continued reference to these figures, three plate members 111, having pairs of apertures 112 formed therein, are secured to the face of reaction plate 23a by means of rivets 113 or the like, with their apertures aligning with apertures 26a formed in reaction plate 23. Fingers 27 cooperate with the walls of apertures 112, as well as with the walls of apertures 26a to establish a driving connection between flywheel 4 and reaction plate 23a.

Plate members 111 are preferably forgings and are provided with fingers 114 that have faces 115 accurately cut thereon for cooperation with faces 97 of weights 61. Weights 61 cooperate with fingers 27 and 114 in the manner described in connection with the first form of my invention.

Extending through aligned apertures in plate 23a, and plate members 111 are machine screws 116, having knurled portions 117 that cooperate with the walls of the apertures in plate 23a to prevent rotation of the screws therein. A plurality of counter-balancing washer members 118 are held in place on screws 116 by means of nuts 119. Washer members 118 are provided for the purpose of dynamically balancing the reaction plate. Reaction plate 23a is naturally lighter between the lever and saddle assemblies, and the washer assemblies are accordingly applied to plate 23a in this region to offset the effect of the lever and saddle assemblies, whereby dynamic balance of the mechanism is secured.

Although I have disclosed and prefer to employ individual plate members 111, it is to be understood that they may be integrally formed as a single ring member and saddles 41 bolted to the latter if desired.

Although I have disclosed, and prefer to employ clutch mechanisms of the "single plate" type, i. e., clutch mechanisms having two driving members and a single driven member, it is to be distinctly understood that my invention is not limited to single plate clutches.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An automatic clutch mechanism comprising, a driving member and a driven member mounted for engagement and disengagement; means for causing said driving member to engage and drive said driven member when one of said members attains a predetermined speed; resilient means for establishing a yielding engagement pressure between said driving and driven members when they are engaged; restraining means for substantially arresting speed-responsive actuation of said means when the latter attains operative condition; and means, independent of said first named restraining means, for augmenting the arresting action of the latter means when said latter means yields to a predetermined degree under the influence of said first named means.

2. An automatic clutch mechanism comprising, a driving member and a driven member mounted for engagement and disengagement; speed-responsive mechanism for producing engagement of said members and for causing pressures to be built up therebetween when one of said members attains a predetermined speed; means for engaging and preventing said speed-responsive mechanism from forcing said members together with a pressure greater than a predetermined pressure when said driving member is operating below a second predetermined speed; and means for limiting the pressure built up between said members to a second predetermined pressure when said driving member is operating at a speed above said second predetermined speed.

3. An automatic clutch mechanism comprising, driving and driven members mounted for engagement and disengagement; a plurality of centrifugally operable movable elements for producing frictional driving engagement of said members when the driving member attains a predetermined speed; resilient means for establishing a yielding engagement pressure between said driving and driven members when they are engaged; and means adapted to act upon said elements in sequence and compoundly for restraining their movement in response to rotation of said driving member in a predetermined manner when said elements attain operative condition, whereby dynamic balance of the mechanism at all speeds is assured.

4. An automatic clutch mechanism comprising, a driving member and a driven member mounted for engagement and disengagement; a reaction member; speed-responsive means acting upon said driving member and reacting against said reaction member for causing said driving member to engage and drive said driven member when said driving member attains a predetermined speed; restraining means associated with said reaction member, for limiting the magnitude of the engaging forces applied to said driving member by said speed-responsive means, and means, independent of said reaction member, for augmenting the limiting action of said restraining means.

5. In a clutch mechanism, a plurality of clutch levers, a rockably mounted member adapted to contact said levers; a second member; resilient means urging said members away from each other and also for urging said first named member into contact with said levers; and means for locking said members against relative rotative movement, while permitting relative axial movement of said members, said last mentioned means being independent of said levers and being so designed as to allow said first named member to rock into a stable position against said levers.

6. In a clutch mechanism, a plurality of levers for actuating a clutch plate; a rockably mounted member adapted to contact said levers; a second member; a plurality of springs interposed between said members and urging the latter away from each other; and common means for retaining said springs in operative assembled relationship with said members, and for preventing relative rotation of said members, said means being so designed as to allow said first named member to freely rock into a stable position against said levers.

7. An automatic clutch mechanism comprising, a driving member and a driven member mounted for engagement and disengagement; a reaction member; a rotatable supporting member; a plurality of outwardly movable, centrifugally operable, elements acting against said driving member and reacting against said reaction member for producing engagement of said members when one of said members attains a predetermined speed; and common means for keying said driving and reaction members to said supporting member, and for limiting outward movement of said elements in response to centrifugal force.

8. In an automatic clutch, a support, a driving member and a reaction member mounted for rotation about a common axis, and adapted to undergo relative axial movement, a plurality of centrifugally operable levers for forcing said driving and reaction members apart when they attain a predetermined speed, means provided on said reaction member and cooperating therewith to afford yielding stops for engaging and substantially arresting outward movement of said levers, and means provided on said support for preventing said levers from causing said stops to yield more than a predetermined degree.

9. The clutch described in claim 8, wherein said last-named means comprises a plurality of stop members which are adapted to be directly contacted by said levers.

10. The clutch described in claim 8, wherein said last-named means comprises a plurality of members secured to said support and extending through apertures in said reaction member.

11. The clutch described in claim 8, wherein said last-named means is operable to effect a driving connection between said support and said driving member.

12. The clutch described in claim 8 wherein said last-named means is operable to effect a driving connection between said support, said driving member and said reaction member.

13. In a clutch having a driving member and a reaction member which are adapted to be separated by a plurality of outwardly rockable weight levers, a set of fingers provided on said reaction member outwardly of said levers, and adapted to be engaged thereby; and a second set of fingers disposed slightly outwardly of said first set of fingers and adapted to be contacted by said levers under certain predetermined conditions.

14. The clutch described in claim 13, wherein said first set of fingers are formed as bracket members and are secured to said reaction member and are operable to reinforce the latter against flexing.

15. In an automatic clutch, in sub-combination, a reaction plate having an aperture therein, a rockable weight lever projecting through said aperture and having a stopping surface, said reaction member being constructed of pressed metal and having an embossed portion disposed outwardly of said aperture, said embossed portion providing a machined plane surface against which the stopping surface of said lever is adapted to rest in substantial surface engagement.

16. The construction set forth in claim 15, wherein said embossed portion is provided with a second plane machined surface contiguous with and disposed normal to said first-named surface.

17. In a clutch mechanism, in sub-combination, a pair of members mounted for rotation about a common axis and adapted to undergo movement toward and away from each other, a plurality of compression springs disposed between said members and normally urging them away from each other, and means disposed within at least one of said springs for establishing a driving connection between said members, said means being capable of permitting said members to undergo rocking movements with respect to each other.

18. An automatic clutch mechanism comprising driving and driven members mounted for engagement and disengagement; an axially movable reaction member; a plurality of outwardly movable, centrifugally operable elements acting against said driving member and reacting against said reaction member for producing engagement of said driving and driven members when one of said members attains a predetermined speed; and means for limiting outward movement of said elements in response to centrifugal force, said means cooperating with said reaction member and said elements so as to direct the outward forces exerted by said elements against the reaction member substantially normal to the axis of the mechanism, whereby distortion of said reaction member is prevented, said means comprising stop members detachably secured to said reaction member radially of said elements.

19. An automatic clutch mechanism comprising driving and driven members mounted for engagement and disengagement, an axially movable reaction member; a plurality of outwardly movable, centrifugally operable elements acting against said driving member and reacting against said reaction member for producing engagement of said driving and driven members when one of said members attains a predetermined speed; and means for limiting outward movement of said elements in response to centrifugal force, said means cooperating with said reaction member and said elements so as to direct the outward forces exerted by said elements against said reaction member substantially normal to the axis of the mechanism, whereby distortion of said reaction member is prevented, said means comprising stop members detachably secured to said reaction member substantially radially of said elements, said stop members having engaging faces provided thereon that are disposed in planes that are substantially parallel to the axis of the mechanism.

20. An automatic clutch mechanism comprising driving and driven members mounted for engagement and disengagement; an axially movable reaction member; a plurality of outwardly movable centrifugally operable elements acting against said driving member and reacting against said reaction member for producing engagement of said driving and driven members when one of said members attains a predetermined speed; and means for limiting outward movement of said elements in response to centrifugal force, said means cooperating with said reaction member and said elements so as to direct the outward forces exerted by said elements against said reaction member substantially normal to the axis of the mechanism, whereby distortion of said reaction member is prevented, said means comprising stop members detachably secured to said reaction member radially outwardly of said elements, said stop members having element-engaging faces provided thereon that present faces disposed substantially parallel to the axis of the mechanism, said elements having faces provided thereon which are adapted to cooperate with the faces of said stop members in surface engagement therewith.

21. In a clutch, in sub-combination, a pair of members mounted for rotation about a common axis and adapted to undergo relative axial movement, one of said members having a plane surface disposed substantially normal to said axis, said other member having a recess therein opposite said plane surface and having a bottom wall disposed substantially parallel to the latter, said other member also having a fulcrum portion disposed substantially in the plane of said plane surface and located adjacent but radially outwardly of said recess, and a centrifugally operable lever element operably associated with said members and having a flat portion engaging said plane surface, a flat surface engaging said bottom wall of said recess, and an outwardly facing fulcrum edge engaging said fulcrum portion.

22. In a clutch mechanism, in sub-combination, a pair of members mounted for rotation about a common axis and adapted to undergo relative axial movement, an axially extending pin secured to one member and projecting toward the other member, a guide element secured to said other member and providing an aperture having a bearing wall adapted to slidingly engage said pin, and a compression spring threaded into said pin and bearing against said guide element, said guide element being engaged in substantially arcuate line contact with said pin, whereby said members may undergo relative rocking movement.

JOSEPH E. PADGETT.